US012222676B2

(12) United States Patent
Fujihara et al.

(10) Patent No.: US 12,222,676 B2
(45) Date of Patent: Feb. 11, 2025

(54) PREPARING METHOD OF ELECTROSTATIC CHARGE IMAGE DEVELOPING TONER, ELECTROSTATIC CHARGE IMAGE DEVELOPING TONER, AND ELECTROSTATIC CHARGE IMAGE DEVELOPER

(71) Applicant: FUJIFILM Business Innovation Corp., Tokyo (JP)

(72) Inventors: Yoshimasa Fujihara, Kanagawa (JP); Daisuke Noguchi, Kanagawa (JP); Kazuhiko Nakamura, Kanagawa (JP); Hiroshi Nakazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 789 days.

(21) Appl. No.: 17/459,010

(22) Filed: Aug. 27, 2021

(65) Prior Publication Data

US 2022/0299899 A1 Sep. 22, 2022

(30) Foreign Application Priority Data

Mar. 19, 2021 (JP) ................................ 2021-046472

(51) Int. Cl.
*G03G 9/08* (2006.01)

(52) U.S. Cl.
CPC ......... *G03G 9/0804* (2013.01); *G03G 9/0819* (2013.01)

(58) Field of Classification Search
CPC . G03G 9/0804; G03G 9/0819; G03G 9/09392
See application file for complete search history.

(56) References Cited

U.S. PATENT DOCUMENTS

2003/0129519 A1* 7/2003 Ishibashi .................. C08J 3/215 430/137.14
2013/0108955 A1 5/2013 Shibata et al.

FOREIGN PATENT DOCUMENTS

JP 2011-102855 A 5/2011
JP 2013-109341 A 6/2013
JP 2019-111462 A 7/2019

* cited by examiner

*Primary Examiner* — Peter L Vajda
(74) *Attorney, Agent, or Firm* — Sughrue Mion, PLLC

(57) ABSTRACT

A preparing method of an electrostatic charge image developing toner includes:

aggregating binder resin particles in a dispersion containing the binder resin particles to form aggregated particles; and coalescing the aggregated particles by heating a dispersion containing the aggregated particles to form toner particles, in which the aggregating includes adding a divalent or higher valent metal salt compound to the dispersion containing the binder resin particles, and the preparing method satisfies the following Requirement (1), Requirement (1): a ratio M/S of a total metal ion amount M (mol) generated from the divalent or higher valent metal salt compound to a total surface area S ($m^2$) of the binder resin particles at a start of the aggregating is $1.5\times10^{10}$ or more and $2.5\times10^{13}$ or less.

18 Claims, No Drawings

PREPARING METHOD OF ELECTROSTATIC CHARGE IMAGE DEVELOPING TONER, ELECTROSTATIC CHARGE IMAGE DEVELOPING TONER, AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-046472 filed on Mar. 19, 2021.

BACKGROUND

(i) Technical Field

The present disclosure relates to a preparing method of an electrostatic charge image developing toner, an electrostatic charge image developing toner, and electrostatic charge image developer.

(ii) Related Art

JP2011-102855A discloses a preparing method of an electrophotographic toner including a step of adding a predetermined amount of an aggregating agent to a dispersion of resin particles to obtain a dispersion containing the resin particles and the aggregating agent, a step of aggregating the resin particles in the dispersion containing the resin particles and the aggregating agent to obtain a dispersion containing aggregated particles, and a step of coalescing the aggregated particles.

JP2013-109341A discloses a preparing method of a toner including: a mixing step of mixing an aqueous dispersion of resin particles containing resin having an acidic polar group and an aqueous dispersion of coloring agent particles containing a coloring agent to obtain a mixed dispersion including the resin particles and the coloring agent particles; an aggregating step of adding an aggregating agent having divalent or higher metal ions to the mixed dispersion to aggregate the resin particles and the coloring agent particles and form aggregated particles; and a coalescing step of adding a chelating agent to a dispersion of the aggregated particles obtained in the aggregating step, and then adding a monovalent aqueous metal salt and heating to reach glass transition point of resin or higher to coalesce the resin particles and the coloring agent particles in the aggregated particles.

JP2019-111462A discloses a preparing method of aggregated particles, the method including a step of mixing and stirring an aqueous dispersion of resin particles and an aggregating agent to aggregate and grow the aggregated particles until a volume median particle diameter reaches a target value, and a step of increasing a stirring power per unit weight when the volume median particle diameter of the aggregated particles reaches a target value.

SUMMARY

Aspects of non-limiting embodiments of the present disclosure relate to a preparing method of an electrostatic charge image developing toner in which a particle size distribution of an electrostatic charge image developing toner to be prepared is narrower, compared to a case where a ratio M/S of a total metal ion amount M (mol) generated from a divalent or higher valent metal salt compound added in an aggregating step to a total surface area S ($m^2$) of binder resin particles at the time of starting the aggregating step is less than $1.5\times10^{10}$ or more than $2.5\times10^{13}$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a preparing method of an electrostatic charge image developing toner, the method including:

aggregating binder resin particles in a dispersion containing the binder resin particles to form aggregated particles; and coalescing the aggregated particles by heating a dispersion containing the aggregated particles to form toner particles, in which the aggregating includes adding a divalent or higher valent metal salt compound to the dispersion containing the binder resin particles, and the preparing method satisfies the following Requirement (1), Requirement (1): a ratio M/S of a total metal ion amount M (mol) generated from the divalent or higher valent metal salt compound to a total surface area S ($m^2$) of the binder resin particles at a start of the aggregating is $1.5\times10^{10}$ or more and $2.5\times10^{13}$ or less.

DETAILED DESCRIPTION

Hereinafter, exemplary embodiments of the present disclosure will be described. These descriptions and examples illustrate exemplary embodiments and do not limit the scope of the exemplary embodiments.

The numerical range indicated by using "to" in the present disclosure indicates a range including the numerical values before and after "to" as the minimum value and the maximum value, respectively.

In a numerical range described in steps in the present disclosure, an upper limit or a lower limit described in one numerical range may be replaced with an upper limit or a lower limit of another numerical range described in steps. Further, in the numerical range described in the present disclosure, the upper limit or the lower limit on the numerical range may be replaced with the value described in examples.

In the present disclosure, the term "step" includes not only an independent step but also other steps as long as the intended purpose of the step is achieved even if it is not able to be clearly distinguished from other steps.

In the present disclosure, each component may contain plural kinds of applicable substances. When referring to the amount of each component in a composition in the present disclosure, in a case where there are plural kinds of substances corresponding to each component in the composition, the amount of each component in the composition means a total amount of the plural kinds of substances present in the composition, unless otherwise specified.

In the present disclosure, plural kinds of particles corresponding to each component may be contained. In a case where there are plural kinds of particles corresponding to each component in a composition, a particle diameter of each component means a value in a mixture of the plural kinds of particles present in the composition, unless otherwise specified.

In the present disclosure, "(meth)acrylic" means at least one of acrylic or methacrylic, and "(meth)acrylate" means at least one of acrylate or methacrylate.

In the present disclosure, a "toner" refers to an "electrostatic charge image developing toner", a "developer" refers to an "electrostatic charge image developer", and a "carrier" refers to a "electrostatic charge image carrier".

In the present disclosure, a method for preparing a toner particle by aggregating and coalescing material particles in a solvent is referred to as an emulsion aggregation (EA) method.

Preparing Method of Electrostatic Charge Image Developing Toner

The preparing method of a toner according to the exemplary embodiment is a preparing method of a toner including preparing toner particles by the EA method, and has the following aggregating step and coalescing step.

Aggregating step: A step of aggregating binder resin particles in a dispersion containing the binder resin particles to form aggregated particles. Coalescing step: A step of coalescing the aggregated particles by heating a dispersion containing the aggregated particles to form toner particles.

The preparing method of a toner according to the exemplary embodiment includes the aggregating step which includes adding a divalent or higher valent metal salt compound to the dispersion containing binder resin particles, and satisfies the following requirement (1).

Requirement (1): a ratio M/S of a total metal ion amount M (mol) generated from the divalent or higher valent metal salt compound added in the aggregating step to a total surface area S ($m^2$) of the binder resin particles at a start of the aggregating step is $1.5\times10^{10}$ or more and $2.5\times10^{13}$ or less.

The total metal ion amount M generated from the divalent or higher valent metal salt compound is a theoretical value calculated from the additive amount of the divalent or higher valent metal salt compound.

The total surface area S ($m^2$) of the binder resin particles at the start of the aggregating step is obtained from the following Equations 1, 2, and 3.

Volume of one binder resin particle ($\mu m^3$)=4/3×π×(Volume average particle diameter (μm) of binder resin particles/2)$^3$ Equation 1

Number of binder resin particles contained in dispersion=Weight (g) of binder resin particles contained in dispersion/Density ($g/m^3$) of binder resin particles/Volume ($\mu m^3$) of one binder resin particle Equation 2

Total surface area S ($m^2$) of binder resin particles=4π×(Volume average particle diameter (μm) of binder resin particles/2)$^2$×Number of binder resin particles contained in dispersion Equation 3

The volume average particle diameter of the binder resin particles in the dispersion refers to a particle diameter when the cumulative percentage becomes 50% from the small diameter side in a particle size distribution measured by a laser diffraction-type particle size distribution measuring device (for example, manufactured by Horiba, Ltd., LA-700).

When the ratio M/S is less than $1.5\times10^{10}$, the growth of the aggregated particles does not proceed, and the particle size distribution of the toner tends to widen toward the smaller diameter side. From the viewpoint, the ratio M/S may be $1.5\times10^{10}$ or more, preferably $3.0\times10^{10}$ or more, more preferably $5.0\times10^{10}$ or more, and still further preferably $7.0\times10^{10}$ or more.

When the ratio M/S is more than $2.5\times10^{13}$, the growth of the aggregated particles proceeds excessively, and the particle size distribution of the toner tends to widen toward the larger diameter side. From the viewpoint, the ratio M/S may be $2.5\times10^{13}$ or less, preferably $2.0\times10^{13}$ or less, more preferably $1.5\times10^{13}$ or less, and still further preferably $1.0\times10^{13}$ or less.

The ratio M/S is controlled by the weight and the volume average particle diameter of the binder resin particles contained in the dispersion and the amount of the divalent or higher valent metal salt compound to be added in the aggregating step.

The preparing method of a toner according to the exemplary embodiment may further include the following aggregation stopping step.

Aggregation stopping step: A step of stopping the growth of the aggregated particles by adding a chelating agent that chelates metal ions generated from the divalent or higher valent metal salt compound to the dispersion containing the aggregated particles.

Hereinafter, steps and materials of the preparing method of a toner according to the exemplary embodiment will be described in detail.

Aggregating Step (First Aggregating Step)

Aggregating step is a step of aggregating at least binder resin particles in a dispersion containing at least the binder resin particles to form aggregated particles.

The dispersion to be used in the aggregating step may further contain at least one of the release agent particles or the coloring agent particles. Therefore, the aggregating step may be a step of further aggregating at least one of the release agent particles or the coloring agent particles together with the binder resin particles.

In a case where the preparing method of a toner according to the exemplary embodiment includes a second aggregating step (step of forming a shell layer) to be described later, the above aggregating step is referred to as a "first aggregating step". The first aggregating step is a step of forming a core in a toner having a core-shell structure.

For example, a resin particle dispersion containing binder resin particles, a release agent particle dispersion containing release agent particles, and a coloring agent particle dispersion containing coloring agent particles are prepared respectively, and these particle dispersions are mixed to prepare the dispersion to be used in the aggregating step. The order of mixing these particle dispersions is not limited.

Hereinafter, what is common to the resin particle dispersion, the release agent particle dispersion, and the coloring agent particle dispersion will be collectively referred to as a "particle dispersion".

An example of the exemplary embodiment of the particle dispersion is a dispersion in which a material is dispersed in a dispersion medium in the form of particles by a surfactant.

The dispersion medium of the particle dispersion may be an aqueous medium. Examples of the aqueous medium include water and alcohol. The water may be water having a reduced ion content such as distilled water and ion exchanged water. These aqueous media may be used alone, or two or more thereof may be used in combination.

The surfactant that disperses the material in a dispersion medium may be any of an anionic surfactant, a cationic surfactant, and a nonionic surfactant. Examples thereof include: anionic surfactants such as sulfate ester salt, sulfonate, phosphoric acid ester, and soap anionic surfactants; cationic surfactants such as amine salt and quaternary ammonium salt cationic surfactants; nonionic surfactants such as polyethylene glycol, alkyl phenol ethylene oxide adduct, and polyhydric alcohol nonionic surfactants; and the like. The surfactants may be used alone, or two or more thereof may be used in combination. Nonionic surfactants may be used in combination with anionic surfactants or cationic surfactants.

Examples of a method of dispersing the material in the dispersion medium in the form of particles include a common dispersing method using a rotary shearing-type homogenizer, or a ball mill, a sand mill, or a Dyno mill as media.

Examples of the method of dispersing the resin in the dispersion medium in the form of particles include a phase inversion emulsification method. The phase inversion emulsification method includes: dissolving a resin in a hydrophobic organic solvent in which the resin is soluble; conducting neutralization by adding a base to an organic continuous phase (O phase); and performing phase inversion from W/O to O/W by adding an aqueous medium (W phase), thereby dispersing the resin as particles in the aqueous medium.

A volume average particle diameter of the particles dispersed in the particle dispersion may be 30 nm or more and 460 nm or less, preferably 50 nm or more and 300 nm or less, more preferably 60 nm or more and 250 nm or less, and further preferably 80 nm or more and 200 nm or less.

The volume average particle diameter of the particles in the particle dispersion refers to a particle diameter when the cumulative percentage becomes 50% from the small diameter side in a particle size distribution measured by a laser diffraction-type particle size distribution measuring device (for example, manufactured by Horiba, Ltd., LA-700).

The content of the particles contained in the particle dispersion may be, for example, 5% by weight or more and 50% by weight or less, preferably 10% by weight or more and 40% by weight or less, and more preferably 15% by weight or more and 30% by weight or less.

Binder Resin

Examples of the binder resin include a homopolymer of monomer such as styrenes (for example, styrene, parachlorostyrene, and α-methylstyrene), (meth)acrylates (for example, methyl acrylate, ethyl acrylate, n-propyl acrylate, n-butyl acrylate, lauryl acrylate, 2-ethyl hexyl acrylate, methyl methacrylate, ethyl methacrylate, n-propyl methacrylate, lauryl methacrylate, and 2-ethyl hexyl methacrylate), ethylenically unsaturated nitriles (for example, acrylonitrile and methacrylonitrile), vinyl ethers (for example, vinyl methyl ether, and vinyl isobutyl ether), vinyl ketones (for example, vinyl methyl ketone, vinyl ethyl ketone, and vinyl isopropenyl ketone), olefins (for example, ethylene, propylene, and butadiene), or a vinyl-based resin formed of a copolymer obtained by combining two or more of these monomers.

Examples of the binder resin also include a non-vinyl resin such as an epoxy resin, a polyester resin, a polyurethane resin, a polyamide resin, a cellulose resin, a polyether resin, and a modified rosin, a mixture of these resins and the vinyl-based resin, or a graft polymer obtained by polymerizing a vinyl monomer in the coexistence.

These binder resins may be used alone, or two or more thereof may be used in combination.

The binder resin may be a polyester resin. Examples of the polyester resin include an amorphous polyester resin and a crystalline polyester resin.

In the exemplary embodiment, "crystalline" of the polyester resin means that a resin has a clear endothermic peak instead of a stepwise endothermic change in differential scanning calorimetry (DSC), and specifically, a half width of an endothermic peak when measured at a heating rate of 10° C./min is within 10° C.

In the exemplary embodiment, the "amorphous" of the polyester resin means that the half width exceeds 10° C., a stepwise endothermic change is shown, or a clear endothermic peak is not recognized.

Amorphous Polyester Resin

Note that, as the amorphous polyester resin, a commercially available product may be used, or a synthetic product may be used.

Examples of the amorphous polyester resin include a condensation polymer of polyvalent carboxylic acid and polyhydric alcohol.

Examples of the polyvalent carboxylic acid which is a polymerization component of the amorphous polyester resin include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, or lower (for example, 1 to 5 carbon atoms) alkyl esters thereof. Among these, as the polyvalent carboxylic acid, for example, aromatic dicarboxylic acid is preferable.

The polyvalent carboxylic acid may be used in combination with dicarboxylic acid and trivalent or higher valent carboxylic acid having a crosslinked structure or a branched structure. Examples of the trivalent or higher carboxylic acid include trimellitic acid, pyromellitic acid, anhydrides thereof, and lower (for example, 1 to 5 carbon atoms) alkyl esters thereof.

These polyvalent carboxylic acids may be used alone, or two or more thereof may be used in combination.

Examples of polyhydric alcohols which is the polymerization component of the amorphous polyester resin include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, a bisphenol A ethylene oxide adduct and a bisphenol A propylene oxide adduct). Among these, as the polyhydric alcohol, for example, aromatic diols and alicyclic diols are preferable, and aromatic diols are more preferable.

As the polyhydric alcohol which is the polymerization component of the amorphous polyester resin, tri- or higher polyhydric alcohol having a crosslinked structure or a branched structure may be used together with the diol. Examples of the tri- or higher polyhydric alcohol include glycerin, trimethylolpropane, and pentaerythritol.

These polyhydric alcohols may be used alone, or two or more thereof may be used in combination.

A glass transition temperature (Tg) of the amorphous polyester resin may be 50° C. or higher and 80° C. or lower, and preferably 50° C. or higher and 65° C. or lower.

The glass transition temperature is obtained from a DSC curve obtained by differential scanning calorimetry (DSC). More specifically, the glass transition temperature is obtained from "extrapolated glass transition onset temperature" described in the method of obtaining a glass transition temperature in JIS K 7121-1987 "testing methods for transition temperatures of plastics".

A weight average molecular weight (Mw) of the amorphous polyester resin may be 5,000 or more and 1,000,000 or less, and preferably 7,000 or more and 500,000 or less.

The number average molecular weight (Mn) of the amorphous polyester resin may be 2,000 or more and 100,000 or less.

The molecular weight distribution Mw/Mn of the amorphous polyester resin may be 1.5 or more and 100 or less, and is preferably 2 or more and 60 or less.

The weight average molecular weight and the number average molecular weight are measured by gel permeation chromatography (GPC). The molecular weight measurement by GPC is performed using GPCHLC-8120 GPC, manufactured by Tosoh Corporation as a measuring device, ColumnTSK gel Super HM-M (15 cm), manufactured by Tosoh Corporation, and a THF solvent. The weight average molecular weight and the number average molecular weight are calculated by using a molecular weight calibration curve plotted from a monodisperse polystyrene standard sample from the results of the foregoing measurement.

A known preparing method is used to prepare the amorphous polyester resin. Specific examples thereof include a method of conducting a reaction at a polymerization temperature set to be 180° C. of higher and 230° C. or lower, if necessary, under reduced pressure in the reaction system, while removing water or an alcohol generated during condensation.

When monomers of the raw materials are not dissolved or compatibilized under a reaction temperature, a high-boiling-point solvent may be added as a solubilizing agent to dissolve the monomers. In this case, a polycondensation reaction is conducted while distilling away the solubilizing agent. When a monomer having poor compatibility is present in a copolymerization reaction, the monomer having poor compatibility and an acid or an alcohol to be polycondensed with the monomer may be previously condensed and then polycondensed with the major component.

Crystalline Polyester Resin

Note that, as the crystalline polyester resin, a commercially available product may be used, or a synthetic product may be used.

Examples of the crystalline polyester resin include a polycondensate of polyvalent carboxylic acid and polyhydric alcohol. Since the crystalline polyester resin easily forms a crystal structure, a polycondensate using a linear aliphatic polymerizable monomer is more preferable than a polymerizable monomer having an aromatic ring.

Examples of the polyvalent carboxylic acid which is the polymerization component of the crystalline polyester resin include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecandicarboxylic acid, 1,14-tetradecandicarboxylic acid, and 1,18-octadecanedicarboxylic acid), aromatic dicarboxylic acids (for example, dibasic acid such as phthalic acid, isophthalic acid, terephthalic acid, and naphthalene-2,6-dicarboxylic acid), anhydrides thereof, or lower (for example, 1 to 5 carbon atoms) alkyl esters thereof.

The polyvalent carboxylic acid may be used in combination with dicarboxylic acid and trivalent or higher carboxylic acid having a crosslinked structure or a branched structure. Examples of the trivalent carboxylic acid include aromatic carboxylic acids (for example, 1,2,3-benzenetricarboxylic acid, 1,2,4-benzenetricarboxylic acid, and 1,2,4-naphthalenetricarboxylic acid), anhydrides thereof, or lower (for example, 1 to 5 carbon atoms) alkyl esters thereof.

As the polyvalent carboxylic acid, a dicarboxylic acid having a sulfonic acid group and a dicarboxylic acid having an ethylenic double bond may be used in combination with these dicarboxylic acids.

These polyvalent carboxylic acids may be used alone, or two or more thereof may be used in combination.

Release Agent

Examples of the release agent include hydrocarbon waxes; natural waxes such as carnauba wax, rice wax, and candelilla wax; synthetic or mineral/petroleum waxes such as montan wax; and ester waxes such as fatty acid esters and montanic acid esters. The release agent is not limited to the examples.

The melting temperature of the release agent may be 50° C. or higher and 110° C. or lower, and preferably 60° C. or higher and 100° C. or lower.

The melting temperature of the release agent is obtained from a DSC curve obtained by differential scanning calorimetry (DSC), and specifically obtained in accordance with "melting peak temperature" described in the method of obtaining a melting temperature in JIS K 7121: 1987 "testing methods for transition temperatures of plastics".

Coloring Agent

Examples of the coloring agent includes various types of pigments such as carbon black, chrome yellow, Hansa yellow, benzidine yellow, threne yellow, quinoline yellow, pigment yellow, Permanent Orange GTR, Pyrazolone Orange, Vulcan Orange, Watch Young Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate, or various types of dyes such as acridine dye, xanthene dye, azo dye, benzoquinone dye, azine dye, anthraquinone dye, thioindigo dye, dioxazine dye, thiazine dye, azomethine dye, indigo dye, phthalocyanine dye, aniline black dye, polymethine dye, triphenylmethane dye, diphenylmethane dye, and thiazole dye. These coloring agents may be used alone, or two or more thereof may be used in combination.

As the coloring agent, if necessary, a surface-treated coloring agent may be used, or a dispersant may be used in combination.

A dispersion obtained by mixing plural kinds of particle dispersions is called a "mixed dispersion".

It is favorable to adjust a pH of the mixed dispersion to 3 or higher and 4 or lower after mixing the plural kinds of particle dispersions. Examples of a method of adjusting the pH of the mixed dispersion include adding an acidic aqueous solution of nitric acid, hydrochloric acid, or sulfuric acid.

A weight ratio of the particles contained in the mixed dispersion may be in the following range.

In a case where the mixed dispersion contains the release agent particles, the weight ratio between the binder resin particles and the release agent particles may be binder resin particles:release agent particles=100:3 to 100:30, preferably 100:5 to 100:25, and more preferably 100:8 to 100:20.

In a case where the mixed dispersion contains the coloring agent particles, the weight ratio between the binder resin particles and the coloring agent particles may be binder resin particles:coloring agent particles=100:5 to 100:35, preferably 100:7 to 100:30, and more preferably 100:9 to 100:25.

A volume average particle diameter of the binder resin particles contained in the mixed dispersion may be 30 nm or more and 460 nm or less, preferably 50 nm or more and 300 nm or less, more preferably 60 nm or more and 250 nm or less, and further preferably 80 nm or more and 200 nm or less.

The volume average particle diameter of the particles in the particle dispersion refers to a particle diameter when the cumulative percentage becomes 50% from the small diameter side in a particle size distribution measured by a laser diffraction-type particle size distribution measuring device (for example, manufactured by Horiba, Ltd., LA-700).

The total weight of the binder resin particles contained in the mixed dispersion may be 50% by weight or more and 90% by weight or less, preferably 55% by weight or more and 90% by weight or less, and more preferably 60% by weight or more and 90% by weight or less, with respect to the total amount of the toner particles formed in the coalescing step.

The aggregating step includes adding an aggregating agent to the mixed dispersion while stirring the mixed dispersion, and heating the mixed dispersion while stirring the mixed dispersion after adding the aggregating agent to the mixed dispersion to raise the temperature of the mixed dispersion.

Examples of the aggregating agent include a surfactant having an opposite polarity to the polarity of the surfactant contained in the mixed dispersion, an inorganic metal salt, a divalent or more metal complex. These aggregating agents may be used alone, or two or more thereof may be used in combination.

Examples of the inorganic metal salt include: metal salt such as calcium chloride, calcium nitrate, barium chloride, magnesium chloride, zinc chloride, aluminum chloride, and aluminum sulfate; an inorganic metal salt polymer such as poly aluminum chloride, poly aluminum hydroxide, and calcium polysulfide; and the like.

In the exemplary embodiment, at least a divalent or higher valent metal salt compound is used as the aggregating agent in an amount satisfying Requirement (1). These divalent or higher valent metal salt compounds may be used alone, or two or more thereof may be used in combination.

The divalent or higher valent metal salt compound may be a trivalent metal salt compound, and a trivalent inorganic aluminum salt compound is preferable. Examples of the trivalent inorganic aluminum salt compound include aluminum chloride, aluminum sulfate, polyaluminum chloride, and polyaluminum hydroxide.

The total metal ion amount M (mol) generated from the divalent or higher valent metal salt compound may be 0.012 mol or more and 0.069 mol or less, preferably 0.02 mol or more and 0.055 mol or less, and more preferably 0.025 mol or more and 0.045 mol or less.

The total metal ion amount M (mol) generated from the divalent or higher valent metal salt compound is a theoretical value calculated from the additive amount (g) of the divalent or higher valent metal salt compound.

A reached temperature of the mixed dispersion when heating the mixed dispersion may be a temperature based on the glass transition temperature (Tg) of the binder resin particles, for example, (Tg—30° C.) or higher of the binder resin particles and (Tg—10° C.) or lower.

In a case where the mixed dispersion contains plural kinds of binder resin particles having different Tg, the lowest temperature of each Tg is used as the Tg in the aggregating step.

Second Aggregating Step

The second aggregating step is a step provided for the purpose of preparing a toner having a core-shell structure, and is a step provided after the first aggregating step. The second aggregating step is a step of forming a shell layer.

The second aggregating step is a step of further mixing a dispersion containing the aggregated particles and a dispersion containing resin particles to be a shell layer and aggregating the resin particles to be a shell layer on surfaces of the aggregated particles to form second aggregated particles.

The dispersion containing the resin particles to be the shell layer may be at least one selected from the binder resin particle dispersion for forming the core, and the polyester resin particle dispersion is preferable.

The second aggregating step includes, for example, adding a dispersion containing the resin particles to be the shell layer to a dispersion containing the aggregated particles while stirring the dispersion containing the aggregated particles, and heating the dispersion containing the aggregated particles after adding the dispersion containing the resin particles to be the shell layer while stirring the dispersion.

A reached temperature of the dispersion containing the aggregated particles reached when heating the dispersion containing the aggregated particles may be a temperature based on the glass transition temperature (Tg) of the resin particles to be the shell layer, for example, (Tg—30° C.) or higher of the resin particles to be the shell layer and (Tg—10° C.) or lower.

Aggregation Stopping Step

The aggregation stopping step is performed for the purpose of stopping the growth of the aggregated particles or the second aggregated particles, after the aggregated particles or the second aggregated particles are grown to a predetermined size and before heating of the coalescing step. The exemplary embodiment to be described below is common to the dispersion containing the aggregated particles and the dispersion containing second aggregated particles.

In the aggregation stopping step, at least one of the chelating agent or an alkaline aqueous solution may be added to the dispersion containing the aggregated particles, and it is preferable to add the chelating agent and the alkaline aqueous solution thereto.

The chelating agent is a chemical substance that chelates the aggregating agent used in the aggregating step. Examples of the chelating agent include: oxycarboxylic acid such as tartaric acid, citric acid, and gluconic acid; aminocarboxylic acid such as iminodiacetic acid (IDA), nitrilotriacetic acid (NTA), and ethylenediaminetetraacetic acid (EDTA); and the like.

A total additive amount of the chelating agent may be, for example, 0.01 parts by weight or more and 5.0 parts by weight or less, and preferably 0.1 parts by weight or more and less than 3.0 parts by weight, with respect to 100 parts by weight of the binder resin particles.

The total additive amount of the chelating agent may be 0.1% by weight or more and 2% by weight or less with respect to the total amount of the toner particles formed in the coalescing step.

The aggregating step may satisfy the following Requirement (2).

Requirement (2): a ratio C/M of a total amount C (mol) of the chelating agent added in the aggregation stopping step to a total metal ion amount M (mol) generated from the divalent or higher valent metal salt compound added in the aggregating step is 0.2 or more and 3.0 or less.

The total metal ion amount M generated from the divalent or higher valent metal salt compound is a theoretical value calculated from the additive amount of the divalent or higher valent metal salt compound.

When the ratio C/M is 0.2 or more, the aggregated particles is prevented from being aggregated and coarse toner particles is prevented from being formed. From the viewpoints, the ratio C/M is preferably 0.3 or more, and more preferably 0.4 or more.

When the ratio C/M is 3.0 or less, since the aggregation power of the aggregated particles does not decrease too much, the aggregated particles is prevented from being separated and fine toner particles is prevented from being formed. From the viewpoints, the ratio C/M is preferably 2.8 or less, and more preferably 2.5 or less.

The ratio C/M is controlled by the amount of chelating agent to be added in the aggregation stopping step.

In the aggregation stopping step, an alkaline aqueous solution may be added to the dispersion containing the aggregated particles. The alkaline aqueous solution may be at least one aqueous solution selected from the group consisting of an aqueous solution of an alkali metal hydroxide and an aqueous solution of an alkaline earth metal hydroxide.

Examples of the aqueous solution of the alkali metal hydroxide or the aqueous solution of the alkaline earth metal hydroxide include an aqueous sodium hydroxide solution, an aqueous potassium hydroxide solution, an aqueous calcium hydroxide solution, and an aqueous barium hydroxide solution, and the aqueous sodium hydroxide solution is preferable.

In a case where the alkaline aqueous solution is added to the dispersion containing the aggregated particles, the pH of the dispersion containing the aggregated particles may not exceed 9, from the viewpoint of maintaining the aggregation of the aggregated particles and preventing the aggregated particles from being separated.

The aggregation stopping step may include reducing a required stiffing power per unit volume stepwise or continuously while stirring the dispersion containing the aggregated particles.

When an alkaline aqueous solution is added to the dispersion containing the aggregated particles to increase the pH of the dispersion containing the aggregated particles, the aggregation power of the aggregated particles tends to decrease. In this case, when the shearing force acting on the aggregated particles due to the stirring is too strong, the aggregated particles may be separated, and as a result, fine toner particles may be produced. Even when the alkaline aqueous solution is added to the dispersion containing the aggregated particles, if the required stirring power per unit volume is reduced, the aggregated particles are prevented from being separated, and as a result, the fine toner particles is prevented from being produced.

The required stirring power per unit volume in the aggregation stopping step may be not less than 0.1 $kW/m^3$, preferably not less than 0.14 $kW/m^3$, and more preferably not less than 0.18 $kW/m^3$, from the viewpoint of preventing the aggregated particles from being aggregated one another and preventing the coarse toner particles from being formed.

The required stirring power per unit volume in the aggregation stopping step may not exceed 3.5 $kW/m^3$, preferably does not exceed 3.4 $kW/m^3$, and more preferably does not exceed 3.3 $kW/m^3$, from the viewpoint of preventing the aggregated particles from being separated and preventing the fine toner particles from being formed.

The required stirring power ($kW/m^3$) per unit volume may be controlled by changing a rotation speed of a stirring unit, according to the viscosity of the dispersion containing the aggregated particles and a dimension of the stirring unit.

The number of steps in a case where the required stirring power per unit volume is reduced stepwise may be any of 1 step, 2 steps, 3 steps, 4 steps, 5 steps, and the like, and preferably 2 steps, 3 steps, or 4 steps.

In the aggregation stopping step, the required stirring power per unit volume may be reduced stepwise in accordance with the stepwise increase in the pH of the dispersion containing the aggregated particles. That is, it is preferable to perform increasing the pH of the dispersion containing the aggregated particles stepwise by adding the alkaline aqueous solution stepwise in conjunction with reducing the required stirring power per unit volume stepwise. Specifically, it is preferable to perform adding the alkaline aqueous solution and then reducing the required stirring power per unit volume plural times (for example, 2 times, 3 times, 4 times, or 5 times).

Coalescing Step

The coalescing step is a step of coalescing the aggregated particles by heating a dispersion containing the aggregated particles to form toner particles.

In a case where the second aggregating step is provided before the coalescing step, the coalescing step is a step of coalescing the second aggregated particles by heating the dispersion containing the second aggregated particles to form toner particles. The toner particles having a core-shell structure may be prepared by going through the second aggregating step and the coalescing step.

The exemplary embodiment to be described below is common to the aggregated particles and the second aggregated particles.

The reached temperature of the dispersion containing the aggregated particles may be glass transition temperature (Tg) of the binder resin or higher, and specifically, preferably a temperature 10° C. to 30° C. higher than the Tg of the binder resin.

In a case where the aggregated particles contain plural kinds of binder resin having different Tg, the highest temperature of each Tg is used as the glass transition temperature in the coalescing step.

After completion of the coalescing step, dried toner particles are obtained by subjecting the toner particles in the dispersion to known cleaning step, a solid-liquid separation step, and drying step. In the cleaning step, displacement cleaning using ion exchanged water may be sufficiently performed from the viewpoint of charging properties. For the solid-liquid separation step, suction filtration, pressure filtration, or the like may be performed from the viewpoint of productivity. For the drying step, freeze drying, airflow drying, fluidized drying, vibration-type fluidized drying, or the like may be performed from the viewpoint of productivity.

Step of Externally Adding External Additive

The preparing method of a toner according to the exemplary embodiment favorably includes a step of externally adding an external additive to the toner particles.

The external addition of the external additive to the toner particles is performed by mixing the dry toner particles and the external additive. The mixing may be performed with, for example, a V-blender, a Henschel mixer, a Lodige mixer, or the like. Furthermore, if necessary, coarse particles of the toner may be removed by using a vibration classifier, a wind classifier, or the like.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, and the like.

The surface of the inorganic particles as the external additive may be treated with a hydrophobizing agent. The hydrophobic treatment is performed, for example, by immersing the inorganic particles in a hydrophobizing agent. The hydrophobizing agent is not particularly limited, and examples thereof include a silane coupling agent, a silicone oil, a titanate coupling agent, and an aluminum coupling agent. These may be used alone, or two or more thereof may be used in combination.

The amount of the hydrophobizing agent is usually, for example, 1 part by weight or more and 10 parts by weight or less with respect to 100 parts by weight of the inorganic particles.

Examples of the external additive also include a resin particle (resin particles such as polystyrene, polymethylmethacrylate, and melamine resin), a cleaning aid (for example, a metal salt of higher fatty acid typified by zinc stearate, and a particle of fluorine-based high molecular weight body), and the like.

The external addition amount of the external additives may be 0.01% by weight or more and 5% by weight or less and preferably 0.01% by weight or more and 2.0% by weight or less, with respect to the weight of the toner particles.

Toner

The toner prepared by the preparing method according to the exemplary embodiment may be an external additive toner in which an external additive is externally added to the toner particles. The form of the external additive is as described above.

The toner prepared by the preparing method according to the exemplary embodiment may be a toner having a single-layer structure, or may be a toner having a core-shell structure including a core portion (core) and a coating layer (shell layer) coating the core portion. The toner having the core-shell structure has: for example, a core portion containing a binder resin, a release agent, and a coloring agent; and a coating layer containing a binder resin.

The content of the binder resin may be 40% by weight or more and 95% by weight or less, preferably 50% by weight or more and 90% by weight or less, and more preferably 60% by weight or more and 85% by weight or less, with respect to the entire toner particles.

The content of the release agent may be 1% by weight or more and 20% by weight or less, and preferably 5% by weight or more and 15% by weight or less with respect to the entire toner.

When the toner contains the coloring agent, the content of the coloring agent may be 1% by weight or more and 30% by weight or less, and preferably 3% by weight or more and 15% by weight or less, with respect to the entire toner.

The volume average particle diameter of the toner particles may be 2 μm or more and 10 μm or less and preferably 4 μm or more and 8 μm or less.

The volume average particle diameter of the toner is measured using Coulter Multisizer Type II (manufactured by Beckman Coulter, Inc.) and an electrolytic solution is measured using ISOTON-II (manufactured by Beckman Coulter, Inc.). In the measurement, a measurement sample of 0.5 mg or more and 50 mg or less is added to 2 ml of 5% by weight aqueous solution of a surfactant (preferably sodium alkylbenzene sulfonate) as a dispersant. This is added to the electrolytic solution of 100 ml to 150 ml.

The electrolytic solution in which the sample is suspended is dispersed for 1 minute by an ultrasonic dispersion. Then, using the Coulter Multisizer II type, the particle size distribution of the particles having a particle diameter of 2 μm or more and 60 μm or less is measured using an aperture having an aperture diameter of 100 μm. The number of particles to be sampled is 50,000. The particle size distribution is drawn from the small diameter side, and a particle diameter at a cumulative total of 50% is defined as the volume average particle diameter D50v.

The average circularity of the toner may be 0.94 or more and 1.00 or less, and preferably 0.95 or more and 0.98 or less.

The average circularity of the toner is (Perimeter of a circle with the same area as a particle projection image)/(Perimeter of the particle projection image). The average circularity of the toner is determined by sampling 3,500 particles with a flow-type particle image analyzer (FPIA-3000 manufactured by SYSMEX CORPORATION).

Developer

The toner prepared by the preparing method according to the exemplary embodiment may be used as a single-component developer, or may be used as a two-component developer by mixing with a carrier.

The carrier is not particularly limited, and a well-known carrier may be used. Examples of the carrier include a coating carrier in which the surface of the core formed of magnetic particles is coated with the resin; a magnetic particle dispersion-type carrier in which the magnetic particles are dispersed and distributed in the matrix resin; and a resin impregnated-type carrier in which a resin is impregnated into the porous magnetic particles.

The magnetic particle dispersion-type carrier or the resin impregnated-type carrier may be a carrier in which the forming particle of the carrier is set as a core and the surface of the core is coated with the resin.

Examples of the magnetic particle include: a magnetic metal such as iron, nickel, and cobalt; a magnetic oxide such as ferrite, and magnetite; and the like.

Examples of the coating resin and the matrix resin include a straight silicone resin formed by containing polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, and an organosiloxane bond, or the modified products thereof, a fluororesin, polyester, polycarbonate, a phenol resin, and an epoxy resin. Other additives such as the conductive particles may be contained in the coating resin and the matrix resin. Examples of the conductive particles include metal such as gold, silver, and copper, carbon black, titanium oxide, zinc oxide, tin oxide, barium sulfate, aluminum borate, and potassium titanate.

Here, in order to coat the surface of the core with the resin, a method of coating the surface with a coating layer forming solution in which the coating resin and various additives (to be used if necessary) are dissolved in a proper solvent is used. The solvent is not particularly limited as long as a solvent is selected in consideration of a kind of a resin to be used and coating suitability.

Specific examples of the resin coating method include: a dipping method of dipping the core into the coating layer forming solution; a spray method of spraying the coating layer forming solution onto the surface of the core; a fluid-bed method of spraying the coating layer forming solution to the core in a state of being floated by the fluid air; a kneader coating method of mixing the core of the carrier with the coating layer forming solution and removing a solvent in the kneader coater; and the like.

The mixing ratio (weight ratio) of the toner to the carrier in the two-component developer may be in a range of toner: carrier=1:100 to 30:100, and is preferably in a range of 3:100 to 20:100.

EXAMPLES

Hereinafter, exemplary embodiments of the disclosure will be described in detail with reference to examples, but the exemplary embodiments of the disclosure are not limited to these examples.

In the following description, unless otherwise specified, “part(s)” and “%” are based on weight.

Unless otherwise specified, synthesis, treatment, preparation and the like are carried out at a room temperature (25° C.±3° C.).

Preparation of Particle Dispersion

Preparation of Amorphous Polyester Resin Particle Dispersion (A)

Terephthalic acid: 70 parts
Fumaric acid: 30 parts
Ethylene glycol: 41 parts
1,5-Pentanediol: 48 parts The above materials are added to a reaction tank provided with a stirrer, a nitrogen introduction tube, a temperature sensor, and a rectification tower, the temperature is raised to 220° C. over 1 hour under a nitrogen gas stream, and 1 part of titanium tetraethoxide is added to total 100 parts of the materials. The temperature is raised to 240° C. over 0.5 hours while distilling off the generated water, and the dehydration condensation reaction is continued at 240° C. for 1 hour, and then a reaction product is cooled. In this manner, an amorphous polyester resin (A) having a weight average molecular weight of 96,000 and a glass transition temperature of 61° C. is obtained.

40 parts of ethyl acetate and 25 parts of 2-butanol are added to a tank provided with a temperature controller and a nitrogen substitution unit to prepare a mixed solvent, and then 100 parts of the amorphous polyester resin (A) is slowly added and dissolved, and 10% aqueous ammonia solution (equivalent to 3 times the molar ratio of the acid value of the resin) is added thereto, and the mixture is stirred for 30 minutes. Next, an inside of the reaction vessel is replaced with dry nitrogen, the temperature is kept at 40° C., and 400 parts of ion exchanged water is added dropwise at a rate of 2 parts/min while stirring the mixture to emulsify. After completion of the dropping, the emulsion is returned to 25° C. and a solvent is removed under the reduced pressure to obtain a resin particle dispersion in which resin particles having a volume average particle diameter of 160 nm are dispersed. Ion exchanged water is added to the resin particle dispersion to adjust the solid content to 20% to obtain an amorphous polyester resin particle dispersion (A).

Preparation of Crystalline Polyester Resin Particle Dispersion (C)

1,10-Decanedicarboxylic acid: 265 parts
1,6-Hexanediol: 168 parts
Dibutyl tin oxide (catalyst): 0.3 parts The above materials are added to a heat-dried reaction tank, the air in the reaction tank is replaced with nitrogen gas to set an inert atmosphere, and the mixture is stirred and refluxed at 180° C. for 5 hours by mechanical stirring. Then, the temperature is slowly raised to 230° C. under the reduced pressure, the mixture is stirred for 2 hours, and when a viscous state is formed, air-cooling is performed and the reaction is stopped. In this manner, a crystalline polyester resin having a weight average molecular weight of 12,700 and a melting temperature of 73° C. is obtained.

90 parts of crystalline polyester resin, 1.8 parts of anionic surfactant (NEOGEN RK, Dai-Ichi Kogyo Seiyaku Co., Ltd.) and 210 parts of ion exchanged water are mixed, heated to 120° C., and dispersed using a homogenizer (Ultratarax T50 manufactured by IKA), and then a dispersion treatment is carried out with a pressure discharge type gaulin homogenizer for 1 hour to obtain a resin particle dispersion in which resin particles having a volume average particle diameter of 160 nm are dispersed. Ion exchanged water is added to the resin particle dispersion to adjust the solid content to 20% to obtain a crystalline polyester resin particle dispersion (C).

Preparation of Release Agent Particle Dispersion (W)

Paraffin wax (Nippon Seiro Co., Ltd., FNP-0090): 100 parts
Anionic surfactant (NEOGEN RK, Dai-Ichi Kogyo Seiyaku Co., Ltd.): 1 part
Ion exchanged water: 350 parts The above materials are mixed, heated to 100° C., and dispersed using a homogenizer (Ultratarax T50 manufactured by IKA), and then dispersed with a pressure discharge type gaulin homogenizer to obtain a release agent particle dispersion in which release agent particles having a volume average particle diameter of 220 nm are dispersed. Ion exchanged water is added to the release agent particle dispersion to adjust the solid content to 20% to obtain a release agent particle dispersion (W).

Preparation of Coloring Agent Particle Dispersion (K)

Carbon black (manufactured by Cabot, Regal 330): 50 parts

Anionic surfactant (NEOGEN RK, Dai-Ichi Kogyo Seiyaku Co., Ltd.): 5 parts

Ion exchanged water: 193 parts

The above materials are mixed and dispersed at 240 MPa for 10 minutes by using an ultimaizer (manufactured by Sugino Machine Ltd.,) to obtain a coloring agent particle dispersion (K) having a solid content concentration of 20%.

Example 1

First Aggregating Step

Ion exchanged water: 200 parts

Amorphous polyester resin particle dispersion (A): 130 parts

Crystalline polyester resin particle dispersion (C): 10 parts

Release agent particle dispersion (W): 10 parts

Coloring agent particle dispersion (K): 15 parts

Anionic surfactant (Tayca Corporation, Tayca Power): 2.8 parts

The above materials are added to a stirring tank and 0.1 N nitric acid is added to adjust the pH to 3.5.

An aqueous aluminum sulfate solution in which 2.5 parts of aluminum sulfate is dissolved in 30 parts of ion exchanged water is prepared and added to a stirring tank. After dispersing at 30° C. using a homogenizer (Ultra Tarax T50 manufactured by IKA), the mixture is heated to 45° C. in a heating oil bath and kept until the volume average particle diameter of the aggregated particles becomes 5.3 μm.

Second Aggregating Step 15 parts of the amorphous polyester resin particle dispersion (A) is added to a stirring tank and kept for 30 minutes. The adding and keeping are performed a total of 4 times. Next, 47 parts of the amorphous polyester resin particle dispersion (A) is added to a stirring tank and kept for 30 minutes to obtain a dispersion containing second aggregated particles.

Aggregation Stopping Step 20 parts of 10% by weight nitrilotriacetic acid (NTA) metal salt aqueous solution (Chelest 70, manufactured by Chelest Corporation) is added to the dispersion containing the second aggregated particles.

Next, adjusting the pH and changing the required stirring power per unit volume are performed in three steps as follows.

(1) A 1N aqueous sodium hydroxide solution is added to adjust the pH to 5, and the required stirring power per unit volume is reduced from 3.2 kW/$m^3$ to 2.8 kW/$m^3$ and kept for 5 minutes.

(2) Next, a 1N aqueous sodium hydroxide solution is added to adjust the pH to 7, and the required stirring power per unit volume is reduced from 2.8 kW/$m^3$ to 1.4 kW/$m^3$ and kept for 3 minutes.

(3) Next, a 1N aqueous sodium hydroxide solution is added to adjust the pH to 9, and the required stirring power per unit volume is reduced from 1.4 kW/$m^3$ to 0.3 kW/$m^3$ and kept for 5 minutes.

Coalescing Step 1.0 part of an anionic surfactant (Tayca Corporation, Tayca Power) is added while continuing stirring in the stirring tank, the mixture is heated to 85° C. and kept for 5 hours. Then, the mixture is cooled to 30° C. at a temperature lowering rate of 0.5° C./min. Next, a solid content is filtered off, washed with ion exchanged water, and dried to obtain toner particles (1) having a volume average particle diameter of 5.9 μm.

Addition of External Additive 100 parts of the toner particles (1) and 1.5 parts of hydrophobic silica particles (RY50, manufactured by Nippon Aerosil Co., Ltd.) are mixed, and further mixed using a sample mill at a rotation speed of 10,000 rpm for 30 seconds. The toner (1) is obtained by sieving with a vibrating sieve having a mesh size of 45 μm. A volume average particle diameter of the toner (1) is 5.9 μm.

Preparation of Carrier 500 parts of spherical magnetite powder particles (volume average particle diameter: 0.55 μm) are stirred with a Henschel mixer, and then 5 parts of a titanate coupling agent is added thereto, heated to 100° C., and stirred for 30 minutes. Next, 6.25 parts of phenol, 9.25 parts of 35% formalin, 500 parts of magnetite particles treated with a titanate coupling agent, 6.25 parts of 25% ammonia aqueous solution, and 425 parts of water are added to a four-necked flask and stirred, and the mixture is reacted at 85° C. for 120 minutes while stirring. Then, the mixture is cooled to 25° C., 500 parts of water is added thereto, and then a supernatant is removed, and a precipitate is washed with water. The water-washed precipitate is heated under the reduced pressure and dried to obtain a carrier (CA) having an average particle diameter of 35 μm.

Preparation of Developer

The toner (1) and the carrier (CA) are added to a V blender at a ratio of toner (1):carrier (CA)=5:95 (weight ratio) and stirred for 20 minutes to obtain a developer (1).

Examples 2 to 10, Comparative Examples 1 to 2

In the same manner as in Example 1, however, Requirement (1) and Requirement (2) are adjusted by adjusting the volume average particle diameter of the binder resin particles, the amount of aluminum sulfate to be added in the aggregating step, and the amount of the nitrilotriacetic acid (NTA) metal salt to be added in the aggregation stopping step, and preparing conditions of the toner particles are changed to the specifications shown in Table 1 to obtain toner particles. Then, as in Example 1, an external additive is added to the toner particles and mixed with a carrier to obtain a developer.

Performance Evaluation

Particle Size Distribution Index

Evaluation is performed using toner particles before external addition as a sample.

The particle size distribution of the toner particles is measured by the above-mentioned measuring method for the volume average particle diameter of the toner. A volume-based cumulative distribution is drawn from the small diameter side, and a cumulative 16% particle diameter D16v and a cumulative 50% particle diameter D50v are determined. The D50v is divided by the D16v to calculate the particle size distribution index on the small diameter side. Table 1 shows the results. The closer the value of D50v/D16v is to 1, the more preferable.

Proportion of Fine Particles

Toner particles having a particle diameter of 3 μm or less are defined as fine particles, and the number proportion (% by number) of the toner particles having a particle diameter of 3 μm or less is determined in the particle size distribution obtained above. Table 1 shows the results.

Proportion of Coarse Particles

Toner particles having a particle diameter of 15 μm or more are defined as coarse particles, and a volume proportion (% by volume) of the toner particles having a particle diameter of 15 μm or more is determined in the particle size distribution obtained above. Table 1 shows the results.

Image Density Unevenness

A developing unit of the image forming apparatus (Docu Centre-IV C5570 remodeling machine, manufactured by Fuji Xerox Co., Ltd.) is filled with a developer. 100 images having an image density of 30% are printed in an environment of a temperature of 10° C. and a relative humidity of 15%. In the 100th image, the image densities at 10 points are randomly measured with an image densitometer X-Rite 938 (manufactured by X-Rite). A density difference between the maximum value and the minimum value among the image densities at 10 points is calculated and classified as follows.

A: Density difference is 0.20 or less

B: Density difference is more than 0.20 and 0.25 or less

C: Density difference is more than 0.25 and 0.30 or less

D: Density difference is more than 0.30

TABLE 1

| | Requirement (1) Ratio M/S | Requirement (2) Ratio C/M | Aggregation stopping step: pH adjustment | | | Aggregation stopping step: Change in required stirring power | | | | D50v | D50v/D16v | Proportion of fine particles % by | Proportion of coarse particles % by | Density unevenness |
|---|---|---|---|---|---|---|---|---|---|---|---|---|---|---|
| | mol/m$^2$ | mol/mol | — | — | — | kW/m$^3$ | kW/m$^3$ | kW/m$^3$ | kW/m$^3$ | μm | — | number | volume | — |
| Comparative Example 1 | $1.4 \times 10^{10}$ | 0.6 | 5 | 7 | 9 | 3.2 | 2.8 | 1.4 | 0.3 | 5.4 | 1.42 | 9.4 | 1.8 | D |
| Comparative Example 2 | $2.7 \times 10^{13}$ | 2.4 | 5 | 7 | 9 | 3.2 | 2.8 | 1.4 | 0.3 | 6.2 | 1.36 | 6.8 | 5.3 | D |
| Example 1 | $2.0 \times 10^{11}$ | 1.3 | 5 | 7 | 9 | 3.2 | 2.8 | 1.4 | 0.3 | 5.9 | 1.15 | 1.5 | 0.3 | A |
| Example 2 | $1.8 \times 10^{10}$ | 0.2 | 5 | 7 | 9 | 3.2 | 2.8 | 1.4 | 0.3 | 5.7 | 1.20 | 2.1 | 0.6 | B |
| Example 3 | $2.4 \times 10^{13}$ | 2.9 | 5 | 7 | 9 | 3.2 | 2.8 | 1.4 | 0.3 | 6.1 | 1.21 | 1.9 | 1.1 | B |
| Example 4 | $2.3 \times 10^{11}$ | 1.5 | 5 | 7 | 9 | 3.1 | 1.8 | 0.2 | 0.1 | 5.8 | 1.22 | 1.5 | 1.1 | B |
| Example 5 | $1.8 \times 10^{11}$ | 0.8 | 5 | 7 | 9 | 2.2 | 1.6 | 0.6 | 0.5 | 5.3 | 1.23 | 1.8 | 1.2 | B |
| Example 6 | $3.2 \times 10^{12}$ | 1.6 | 5 | 7 | 9 | 3.1 | 3.1 | 3.1 | 3.1 | 5.4 | 1.32 | 5.1 | 0.9 | B |
| Example 7 | $2.8 \times 10^{12}$ | 1.7 | 5 | 7 | 9 | 2.2 | 2.2 | 2.2 | 2.2 | 5.2 | 1.27 | 3.7 | 1.6 | B |
| Example 8 | $2.0 \times 10^{11}$ | 2.1 | 5 | 7 | 9 | 4.0 | 2.8 | 1.4 | 0.3 | 5.9 | 1.25 | 3.7 | 0.7 | B |
| Example 9 | $2.1 \times 10^{11}$ | 1.8 | 5 | 7 | 9 | 3.2 | 2.8 | 1.4 | 0.05 | 5.1 | 1.21 | 2.2 | 1.3 | B |
| Example 10 | $1.8 \times 10^{11}$ | 1.9 | 5 | 7 | 10 | 3.2 | 2.8 | 1.4 | 0.3 | 5.4 | 1.26 | 4.2 | 0.4 | C |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A preparing method of an electrostatic charge image developing toner, the method comprising:

aggregating binder resin particles in a dispersion containing the binder resin particles to form aggregated particles; and coalescing the aggregated particles by heating a dispersion containing the aggregated particles to form toner particles, wherein the aggregating includes adding a divalent or higher valent metal salt compound to the dispersion containing the binder resin particles, and the preparing method satisfies the following Requirement (1), Requirement (1): a ratio M/S of a total metal ion amount M (mol) generated from the divalent or higher valent metal salt compound to a total surface area S (m$^2$) of the binder resin particles at a start of the aggregating is $1.5\times10^{10}$ or more and $2.5\times10^{13}$ or less.

2. The preparing method of an electrostatic charge image developing toner according to claim 1, wherein a volume average particle diameter of the binder resin particles at the start of the aggregating is 30 nm or more and 460 nm or less.

3. The preparing method of an electrostatic charge image developing toner according to claim 1, wherein a total weight of the binder resin particles at the start of the aggregating is 50% by weight or more and 90% by weight or less with respect to a total amount of the toner particles formed in the coalescing.

4. The preparing method of an electrostatic charge image developing toner according to claim 2, wherein a total weight of the binder resin particles at the start of the aggregating is 50% by weight or more and 90% by weight or less with respect to a total amount of the toner particles formed in the coalescing.

5. The preparing method of an electrostatic charge image developing toner according to claim 1, further comprising:

stopping growth of the aggregated particles by adding a chelating agent that chelates metal ions generated from the divalent or higher valent metal salt compound to the dispersion containing the aggregated particles, wherein the preparing method satisfies the following Requirement (2), Requirement (2): a ratio C/M of a total amount C (mol) of the chelating agent to the total metal ion amount M (mol) generated from the divalent or higher valent metal salt compound is 0.2 or more and 3.0 or less.

6. The preparing method of an electrostatic charge image developing toner according to claim 2, further comprising:

stopping growth of the aggregated particles by adding a chelating agent that chelates metal ions generated from the divalent or higher valent metal salt compound to the dispersion containing the aggregated particles, wherein the preparing method satisfies the following Requirement (2), Requirement (2): a ratio C/M of a total amount C (mol) of the chelating agent to the total metal ion amount M (mol) generated from the divalent or higher valent metal salt compound is 0.2 or more and 3.0 or less.

7. The preparing method of an electrostatic charge image developing toner according to claim 3, further comprising:

stopping growth of the aggregated particles by adding a chelating agent that chelates metal ions generated from the divalent or higher valent metal salt compound to the dispersion containing the aggregated particles, wherein the preparing method satisfies the following Requirement (2), Requirement (2): a ratio C/M of a total amount C (mol) of the chelating agent to the total metal ion amount M (mol) generated from the divalent or higher valent metal salt compound is 0.2 or more and 3.0 or less.

8. The preparing method of an electrostatic charge image developing toner according to claim 4, further comprising:

stopping growth of the aggregated particles by adding a chelating agent that chelates metal ions generated from the divalent or higher valent metal salt compound to the dispersion containing the aggregated particles, wherein the preparing method satisfies the following Requirement (2), Requirement (2): a ratio C/M of a total amount C (mol) of the chelating agent to the total metal ion amount M (mol) generated from the divalent or higher valent metal salt compound is 0.2 or more and 3.0 or less.

9. The preparing method of an electrostatic charge image developing toner according to claim 5, wherein the stopping includes adding at least one aqueous solution selected from the group consisting of an aqueous solution of an alkali metal hydroxide and an aqueous solution of an alkaline earth metal hydroxide to the dispersion containing the aggregated particles.

10. The preparing method of an electrostatic charge image developing toner according to claim 6, wherein the stopping includes adding at least one aqueous solution selected from the group consisting of an aqueous solution of an alkali metal hydroxide and an aqueous solution of an alkaline earth metal hydroxide to the dispersion containing the aggregated particles.

11. The preparing method of an electrostatic charge image developing toner according to claim 7, wherein the stopping includes adding at least one aqueous solution selected from the group consisting of an aqueous solution of an alkali metal hydroxide and an aqueous solution of an alkaline earth metal hydroxide to the dispersion containing the aggregated particles.

12. The preparing method of an electrostatic charge image developing toner according to claim 9, wherein a pH of the dispersion containing the aggregated particles does not exceed 9 in the stopping.

13. The preparing method of an electrostatic charge image developing toner according to claim 5, wherein the stopping includes reducing a required stirring power per unit volume stepwise or continuously while stirring the dispersion containing the aggregated particles.

14. The preparing method of an electrostatic charge image developing toner according to claim 13, wherein the required stirring power per unit volume is not less than 0.1 $kW/m^3$ in the stopping.

15. The preparing method of an electrostatic charge image developing toner according to claim 13, wherein the required stirring power per unit volume does not exceed 3.5 $kW/m^3$ in the stopping.

16. The preparing method of an electrostatic charge image developing toner according to claim 1, wherein the dispersion containing the binder resin particles further contains release agent particles, and in the aggregating, the release agent particles are further aggregated to form the aggregated particles.

17. The preparing method of an electrostatic charge image developing toner according to claim 1, wherein the dispersion containing the binder resin particles further contains coloring agent particles, and in the aggregating, the coloring agent particles are further aggregated to form the aggregated particles.

18. The preparing method of an electrostatic charge image developing toner according to claim 1, further comprising:

after the aggregating, second aggregating of further mixing the dispersion containing the aggregated particles and a dispersion containing resin particles to be a shell layer and aggregating the resin particles to be the shell layer on surfaces of the aggregated particles to form second aggregated particles, wherein in the coalescing, a dispersion containing the second aggregated particles is heated and the second aggregated particles are coalesced to form toner particles.

* * * * *